United States Patent [19]

Dietz et al.

[11] 4,451,656

[45] May 29, 1984

[54] IMIDAZOLINE ADDITION COMPOUNDS

[75] Inventors: Erwin Dietz, Kelkheim; Albert Münkel, Frankfurt am Main, both of Fed. Rep. of Germany

[73] Assignee: Hoechst Aktiengesellschaft, Frankfurt am Main, Fed. Rep. of Germany

[21] Appl. No.: 414,813

[22] Filed: Sep. 3, 1982

[30] Foreign Application Priority Data

Sep. 5, 1981 [DE] Fed. Rep. of Germany ....... 3135327

[51] Int. Cl.$^3$ .......................................... C07D 233/18
[52] U.S. Cl. .................................. 548/352; 252/357
[58] Field of Search ......................................... 548/352

[56] References Cited

U.S. PATENT DOCUMENTS 2,647,125  7/1953  Gunderson ......................... 548/352
2,987,515  6/1961  Stromberg et al. ............. 548/352 X

*Primary Examiner*—Richard A. Schwartz
*Attorney, Agent, or Firm*—Curtis, Morris & Safford

[57] ABSTRACT

In the present application, addition compounds of hydroxyalkylimidazolines, aromatic or araliphatic diisocyanates and polyols are described and claimed, as are their preparation by reaction, initially of two reactants and then with the third, optionally in an inert solvent, and the use of these addition compounds as dispersants for solid materials in non-aqueous liquids, in particular pigment dispersions.

5 Claims, No Drawings

IMIDAZOLINE ADDITION COMPOUNDS

The invention relates to addition compounds which can be obtained from hydroxyalkylimidazolines, diisocyanates and polyols, and processes for the preparation of these addition compounds and their use as dispersants for solid materials in non-aqueous liquids.

Suitable hydroxyalkylimidazolines for the preparation of the addition compounds according to the invention correspond to the general formula below

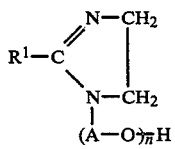 (1)

wherein $R^1$ represents an alkyl, alkenyl or alkapolyenyl radical having 6 to 30 C atoms, A represents an alkylene radical having 2 to 6 C atoms and n represents a number from 1 to 20.

Compounds of the formula (1), which contain aliphatic radicals of natural fatty acids as the radical $R^1$ and a $-CH_2-CH_2-$ grouping as A and in which n is 1, are particularly suitable.

Suitable diisocyanates are compounds of the formula below:

$$OCN-X-NCO \quad (2)$$

wherein X represents a bivalent aromatic or araliphatic radical having 6 to 20 C atoms.

Examples of suitable compounds are those containing a phenylene, toluylene, xylylene, naphthylene, diphenylene or diphenylenealkane grouping as X.

Attention is particularly drawn to 2,4- and 2,6-toluylene diisocyanate and their mixtures, diphenylmethane-4,4'-diisocyanate and 1,5-naphthalene diisocyanate.

Suitable polyol components are aliphatic compounds which contain at least two hydroxyl groups and corresponding to the general formula below:

$$Y-[OH]_m \quad (3)$$

In formula (3), m represents a whole number from 2 to 6 and Y represents an aliphatic radical having at least 2 C atoms or having 2 to 12 C atoms, which can be interrupted by $-O-$,

and $-CO-$ groups and their combinations. The following are particularly mentioned: 1,2-ethanediol, 1,2- and 1,3-propanediol, butanediols, hexanediols, octanediols, glycerol, butanetriols, hexanetriols, 1,1,1-trimethylolpropane, 1,1,1-trimethylolethane, pentaerythritol, butenediols, hexenediols, butynediols, hexynediols and addition products of ethylene and/or propylene oxide with the polyols mentioned, including polyethylene and polypropylene glycols and their copolymers, and also hydroxyalkylamines or hydroxyalkylamides of the general formula below:

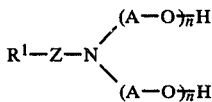 (4)

wherein $R^1$, A and n have the meanings described for formula (1) and Z represents a $-CH_2-$ or $-CO-$ grouping.

The addition products according to the invention can be prepared by the processes below: The diisocyanate is dissolved in an inert solvent and reacted with the polyol. This dissolved addition product thus obtained is then added to the hydroxyalkylimidazoline component. However, the hydroxyalkylimidazoline and the polyol can be dissolved in an inert solvent and the diisocyanate, depending on its consistency, can be added as the substance or in solution. The reaction is complete when isocyanate bands are no longer seen in the IR spectrum.

For the preparation of the addition products according to the invention, all solvents are suitable which are inert toward the reactants and in which the reactants and the reaction product obtained are soluble, at least to some extent. Examples to be mentioned are: hydrocarbons, in particular toluene and xylenes, chlorinated hydrocarbons, in particular methylene chloride, chloroform, carbon tetrachloride, trichloroethane, trichloroethane and chlorobenzene, esters, such as ethyl acetate, butyl acetate, glycol acetates, ketones, such as methyl ethyl ketone, methyl isobutyl ketone and cyclohexanone, ethers, such as diisopropyl ether, dibutyl ether, glycol dimethyl ether and diglycol dimethyl ether, esters of glycol ethers, such as ethylglycol acetate, butylglycol acetate, methylglycol acetate, 3-methoxy-n-butyl acetate, butyldiglycol acetate and acid amides, such as N-methylpyrrolidone and dimethylformamide.

The reactions are preferably carried out at temperatures from 0° to 120° C., in particular from 40° to 100° C. The solvents can, depending on the boiling point and area of use, remain in the reaction mixture or be removed, for example by distillation.

A further possibility for the preparation of the addition compounds according to the invention is to carry out the reaction with or without solvent at temperatures above 120° C. For this purpose, the hydroxyalkylimidazoline compound and the polyol are initially introduced alone or in a high-boiling inert solvent and the diisocyanate is added at temperatures of 120° to 200° C., up to 1 mole of carbon dioxide being split off per mole of diisocyanate.

When the reaction is carried out without a solvent, the viscosity of the reaction medium should be controlled by the temperature so that thorough mixing is ensured. For this reason, courses of reaction are preferred in which the temperature rises during the reaction, it being possible for the heat of reaction produced to be utilized. Thus, it is advantageous initially to introduce the hydroxyalkylimidazoline compound and the polyol and heat to 50° to 120° C. After the addition of the diisocyanate, in particular toluylene diisocyanate, the reaction is driven to completion at temperatures of 150° to 250° C., the splitting off of carbon dioxide, which has already been mentioned, taking place.

The upper limit of the temperature should be selected so that no decomposition of the reaction product occurs.

Preferred addition compounds are obtained when mmoles of diisocyanate of the formula (2) are reacted with one mole of polyol of the formula (3), which has m OH groups, and mmoles of hydroxyalkylimidazoline of the formula (1). In order to obtain addition compounds which do not contain isocyanate groups, it is expedient to employ a small excess of polyol or hydroxyalkylimidazoline. If polyols having 2 OH groups are reacted with toluylene diisocyanate, further preferred addition compounds according to the invention are obtained when a moles of a dihydric polyol of the formula (3) are reacted with a+1 moles of toluylene diisocyanate and 2 moles of hydroxyalkylimidazoline of the formula (1), a representing a number from 2 to 5.

The addition products according to the invention are suitable as dispersants for solid materials, especially for pigments and fillers in non-aqueous media.

The suitability of the addition compounds according to the invention for the production of pigment dispersions is particularly emphasized. Pigment dispersions of this type can contain inorganic and/or organic pigments. Examples of suitable inorganic pigments are white and colored pigments, such as titanium oxides, zinc oxides, zinc sulfides, cadmium sulfides or selenides, iron oxides, chromium oxides, chromate pigments, mixed oxides, which are suitable as pigments, of the elements aluminum, antimony, chromium, iron, cobalt, copper, nickel, titanium and zinc and also blended pigments and especially carbon blacks.

Examples of suitable organic pigments which may be mentioned are: azo pigments, azamethines, azaporphines, quinacridones, flavanthrone, anthanthrone and pyranthrone materials, derivatives of naphthalenetetracarboxylic acid, of perylenetetracarboxylic acid, of thioindigo, of dioxazine and of tetrachloroisoindolinone, laked pigments, such as Mg, Ca, Sr, Ba, Al, Mn, Co and Ni salts of dyestuffs containing acid groups, and corresponding mixtures of pigments.

Depending on the area of use, the solid materials, especially pigments, can be dispersed alone in the addition products according to the invention or additionally, with the aid of the addition products according to the invention, in non-aqueous liquids. The dispersions of solid material can contain, apart from the addition compounds according to the invention, further customary additives, such as foaming and viscosity regulators, sedimentation inhibitors, wetting agents and solvents and also non-aqueous liquids.

The non-aqueous media which have proved suitable for the production of liquid dispersions are the solvents and liquids which are employed in the plastics, printing and coatings industries, and in which the addition products according to the invention dissolve, at least to some extent.

Examples of such solvents to be mentioned are: aromatic and aliphatic hydrocarbons, such as xylene, toluene, petroleum ether, white spirit, cyclohexane, halogenated hydrocarbons, such as methylene chloride, trichloroethylene, trichloroethane or chlorobenzene, alcohols, such as ethanol, butanol or cyclohexanol, ketones, such as ethyl methyl ketone or cyclohexanone, esters, such as ethyl and butyl acetate, glycol ethers and esters, such as ethylglycol, butylglycol, ethyldiglycol, ethyldiglycol acetate and butyldiglycol acetate, hexyldiglycol and ethylene glycol acetate, acid amides, such as N-methylpyrrolidone and dimethylformamide, and also mixtures of these solvents.

Solvents of low volatility and plasticizers, such as are customary in the plastics as well as paint and varnish industries, are also suitable, for example, alkyl and/or aryl esters of dibasic or polybasic acids, such as maleic acid, succinic acid, adipic acid, sebacic acid, phthalic acid, terephthalic acid and phosphoric acid, alkylphenols and their reaction products with ethylene and/or propylene oxide. However, it is also possible to use oils, such as linseed oil and castor oil, and fatty acids, for example oleic acid and their esters. Adducts of ethylene and/or propylene oxide to diols or triols are particularly suitable for the production of free-flowing pigment dispersions.

If the pigment dispersions contain volatile solvents, they can be further processed either in the liquid or in the dried form. When required, they can also be milled, easily dispersible pigments thus being obtained.

Preferred dispersions contain 2 to 80% by weight, preferably 10 to 70% by weight, of solid materials, 0.2 to 10% by weight, preferably 0.5 to 4% by weight, of the addition products according to the invention and 20 to 98% by weight, preferably 30 to 90% by weight, of non-aqueous liquids.

The production of the dispersions of solid materials is carried out, depending on the grain texture of the solid materials employed, for example with agitators, dissolvers, rotor-stator mills, ball mills, agitator ball mills (sand or bead mills), in rapid mixers, kneading equipment or in roller mills.

Dispersions of solid materials, which contain the addition products according to the invention, have a high stability and a high solids content with, at the same time, good rheological properties.

If the solid materials employed are organic pigments, inorganic pigments and/or carbon blacks, dispersions are obtained which have many uses.

For example, they are suitable for pigmenting coating media and plastics, especially polyurethane foams. The good dispersing properties of the addition compounds according to the invention lead to pigment dispersions having high coloring power and brilliance. Pigment dispersions with the addition compounds according to the invention are distinguished by high flocculation stability and good flow properties compared to pigment dispersions without this addition.

In the following preparation examples, parts denote parts by weight and percentages and ratios relate to weight.

EXAMPLE 1

700 parts of 2-[2-(8-heptadecen-1-yl)-4,5-dihydro-1-imidazolyl]ethanol and 62 parts of 1,2-ethanediol were dissolved in 2,500 parts of carbon tetrachloride. 340 parts of toluylene diisocyanate, containing 80% of 2,4-toluylene diisocyanate and 20% of 2,6-toluylene diisocyanate, were slowly added to the boiling solution. After a reaction time of 1 hour, the solvent was removed by distillation. A highly viscous resin-like product was obtained, which no longer showed NCO groups in the IR spectrum.

EXAMPLE 2

35 parts of 2-[2-(8-heptadecen-1-yl)-4,5-dihydro-1-imidazolyl]ethanol were dissolved in 200 parts of xylene and the solution was heated to 50° C. 36 parts of a 67% strength solution of a reaction product from 3 moles of toluylene diisocyanate and 1 mole of 1,1,1-trimethylolpropane in ethylglycol acetate/xylene (1:1) were added to this solution at this temperature, with stirring. The reaction mixture was subsequently stirred for 1 hour at 80° C.

EXAMPLE 3

350 parts of 2-[2-(8-heptadecen-1-yl)-4,5-dihydro-1-imidazolyl]ethanol and 67 parts of dipropylene glycol were dissolved in 350 parts of diglycol dimethyl ether, and the solution was heated to 70° C. At this temperature, 174 parts of toluylene diisocyanate, containing 65% of 2,4-toluylene diisocyanate and 35% of 2,6-toluylene diisocyanate, were added, with stirring. The reaction mixture was subsequently stirred for 1 hour at 80° C.

EXAMPLE 4

350 parts of 2-[2-(8-heptadecen-1-yl)-4,5-dihydro-1-imidazolyl]ethanol and 135 parts of 1,4-butanediol in 830 parts of N-methylpyrrolidone were initially introduced and heated to 45° C. Then 348 parts of toluylene diisocyanate, containing 80% of 2,4-toluylene diisocyanate and 20% of 2,6-toluylene diisocyanate, were metered in so that the temperature rose to 75° C. The reaction mixture was stirred for a further 1 hour at 80° C.

EXAMPLE 5

350 parts of 2-[2-(8-heptadecen-1-yl)-4,5-dihydro-1-imidazolyl]ethanol and 31 parts of 1,2-ethanediol were initially introduced and heated to 50° C. 174 parts of toluylene diisocyanate, containing 80% of 2,4-toluylene diisocyanate and 20% of 2,6-toluylene diisocyanate, were allowed to rapidly run into this homogeneous solution, the temperature of which rose to about 160° C. due to the heat of reaction produced, and copious evolution of carbon dioxide began. After the reaction had moderated, the mixture was stirred a further 1 hour at 175° C. Overall, 44 parts of carbon dioxide were split off and a dark resin-like highly viscous reaction product was obtained.

EXAMPLE 6

350 parts of 2-[2-(8-heptadecen-1-yl)-4,5-dihydro-1-imidazolyl]ethanol and 31 parts of 1,2-ethanediol were initially introduced and heated to 150° C. 174 parts of toluylene diisocyanate were metered in at this temperature, whereupon carbon dioxide began to be evolved. After a reaction time of 1 hour at 175° C., during which 44 parts of carbon dioxide were liberated, a further 31 parts of 1,2-ethanediol were added to the reaction mixture and the reaction mixture was again reacted with 174 parts of toluylene diisocyanate. After stirring for a further 1 hour at 175° C., a further 44 parts of carbon dioxide were split off. A resin-like product, which was solid when cold, was obtained.

EXAMPLE 7

385 parts of 2-[2-(1-coconut fatty alkyl*)-4,5-dihydro-1-imidazolyl]ethanol and 350 parts of an adduct of 5 moles of ethylene oxide to oleylamine were initially introduced and heated to 50° C. After the addition of 244 parts of toluylene diisocyanate, the temperature rose to 100° C., while the viscosity of the reaction medium increased greatly. 60 parts of carbon dioxide were liberated during a reaction time of 1 hour at 175° C.

EXAMPLE 8

490 parts of 2-[2-(8-heptadecen-1-yl)-4,5-dihydro-1-imidazolyl]ethanol and 210 parts of coconut fatty acid diethanolamide* were initially introduced and heated to 55° C. After the addition of 244 parts of toluylene diisocyanate, the temperature rose to 110° C. The mixture was stirred for 1 hour at 170° C., during which 60 parts of carbon dioxide were split off.
*The coconut fatty acid employed for preparing this compound has the following approximate distribution of C chains:
5% C8, 6% C10, 52% C12, 20% C14, 9% C16, 2% C18, 4% C18 (with one double bond) and 2% C18 (with two double bonds)

EXAMPLE 9

350 parts of 2-[2-(8-heptadecen-1-yl)-4,5-dihydro-1-imidazolyl]ethanol and 245 parts of an adduct of 5 moles of ethylene oxide to oleylamine were dissolved in 555 parts of N-methylpyrrolidone and heated to 50° C. Then a suspension of 210 parts of 1,5-naphthalene diisocyanate in 460 parts of N-methylpyrrolidone was added. The reaction mixture was stirred a further 1 hour at 80° C.

EXAMPLE 10

150 parts of a polyglycol, having a mean molecular weight of 600, 28 parts of 3-hexyne-2,5-diol and 350 parts of 2-[2-(8-heptadecen-1-yl)-4,5-dihydro-1-imidazolyl]ethanol were dissolved in 350 parts of butyldiglycol acetate and heated to 150° C. At this temperature, 250 parts of 4,4'-diphenyl methane diisocyanate were metered in and the mixture was subsequently stirred a further 1 hour at 175° C. 24 parts of carbon dioxide were liberated in the reaction.

EXAMPLE 11

8 parts of the addition compound from Example 1 were dissolved in 304 parts of a branched polyether, having a mean molecular weight of 4,800 which was obtained by reaction of 1 mole of 1,1,1-trimethylolpropane with 70 moles of propylene oxide and 14 moles of ethylene oxide, and 88 parts of a furnace black, having a BET surface area of 45 m²/g and 0.6% of volatile components, were stirred in. The carbon black suspension thus obtained was dispersed in a bead mill using siliquartzite glass beads of 1 mm diameter for 40 minutes. A very good free-flowing black dispersion, having a carbon black content of 22%, was obtained which was particularly excellent for coloring polyether-urethane foams. On pigmenting a polyurethane integral-skin foam by known processes, a uniform deep coloration was obtained with no damage to the texture of the foam.

If the addition compound employed in the example described is replaced by the polyol, the carbon black suspension cannot be milled. A consistency which can be milled is only achieved up to a maximum carbon black content of 18%.

EXAMPLE 12

468 parts of a branched polyether, having a hydroxyl value of 36 mg of KOH/g and a viscosity of 1.2 Pa.s at 20° C., were mixed with 12 parts of the pure addition compound (solvents were removed by distillation in vacuo) from Example 2. Subsequently, 120 parts of a surface-oxidized gas black, having a mean particle size of 25 nm and a pH of 3.0 (in aqueous suspension), were stirred into the solution thus obtained. The gas black suspension obtained was dispersed in a bead mill using siliquartzite glass beads of 1 mm diameter for 30 minutes. A very free-flowing flocculation-stable black dispersion was obtained. The black suspension described cannot be milled when the addition compound employed is replaced by the polyether.

EXAMPLE 13

30 parts of a furnace black, having a mean particle size of 50 nm and a pH (in aqueous suspension) of 3, were dispersed with 2 parts of the addition product from Example 5 and 28 parts of dioctyl phthalate in a kneader for 1 hour. Subsequently, the kneaded material was diluted with 40 parts of dioctyl phthalate to give a free-flowing carbon black dispersion, which could easily be stirred into a polyvinyl chloride coating paste which contained 1 part of stabilized rutile pigment, 59.3 parts of a paste-forming emulsion PVC, having a K value (DIN 53,726) of 72, 39.6 parts of dioctyl phthalate and 0.1 part of stabilizer. The 1% strength colored coating paste was taken up on glazed cardboard and heated at 160° C. for 5 min; an intense coloration was obtained.

Comparable results are obtained when, in Example 13, the 2 parts of the addition product from Example 5 are replaced by 2 parts of the addition product from Example 6. In contrast, if, in Example 13, 2 parts of the addition product from Example 5 are replaced by 2 parts of dioctyl phthalate, a black paste is obtained, which is not free-flowing and which, in the PVC coating paste, leads to a coloration of lower intensity than the coloration of Example 13.

EXAMPLE 14

200 parts of C.I. Pigment Blue 15:3 (Color Index No. 74,160) were stirred into 754 parts of an adduct of 57 moles of propylene oxide and 13 moles of ethylene oxide to 1 mole of glycerol and 46 parts of the solution of the addition product from Example 9, using a sawtooth stirrer, and then dispersed using a bead mill. The free-flowing pigment dispersion produced in this manner was particularly suitable for coloring polyurethane foam materials and led to brilliant and intense colorations.

EXAMPLE 15

In accordance with Example 14 a pigment dispersion was produced, which contained the following components: 30 parts of the furnace black described in Example 13, 2 parts of the addition product from Example 7 and 68 parts of butyldiglycol acetate. This carbon black dispersion was stirred, to a concentration of 1% strength, into an exterior wall paint based on a vinyltoluene/acrylate copolymer, containing 15 parts of stabilized rutile pigment, 34 parts of blended pigments (principally dolomite), 7 parts of a commercial vinyltoluene/acrylate copolymer suitable for exterior wall paints, 14 parts of a 10% strength solution of a commercial modified vinyltoluene/acrylate copolymer suitable for external wall paints in a mixture of aromatic and aliphatic hydrocarbons, and 30 parts of a mixture of stabilizer, chloroparaffin and white spirit, and taken up on glazed cardboard; colorations were obtained having high intensity and exhibiting no signs of flocculation.

EXAMPLE 16

2 parts of C.I. Pigment Red 168 (Color Index No. 59,300) were dispersed together with 1 part of the addition product from Example 1 in a kneader heated to 80° C. After a dispersion time of 1 hour, the kneaded material was cooled down and milled. A powdery pigment preparation, which did not form dust, was obtained. This preparation was stirred, to a concentration of 1% strength, into an air-dried alkyd resin lacquer, containing 30 parts of stabilized rutile pigment, 37.5 parts of long-oil alkyd resins based on vegetable fatty acids, 32.5 parts of a mixture of dry materials, stabilizers, white spirit and mineral spirit, and taken up on glazed cardboard; brilliant colorations were obtained, which were free of specks and showed no signs of flocculation.

EXAMPLE 17

For the purposes of comparison, a titanium dioxide paste, composed of 650 parts of $TiO_2$ and 350 parts of a branched polyether, having a mean molecular weight of 6,500 and a viscosity of 1275 mPa.s at 25° C., was produced. 96 parts of the paste produced were mixed with 4 parts of the polyether and the dynamic viscosity at $n=62.5$ $s^{-1}$ was measured to be 13.6 Pa.s. In comparison with this, 96 parts of the paste produced were mixed with 4 parts of the addition product from Example 4 and the dynamic viscosity at $n=62.5$ $s^{-1}$ was measured to be 9.7 Pa.s.

EXAMPLE 18

15 parts of the addition compound from Example 3 were dissolved in 410 parts of a branched polyether, having an OH number of 35 mg of KOH/g and a viscosity of 830 mPa.s at 25° C., and 75 parts of a surface-oxidized gas black, having a BET surface area of 110 $m^2/g$, were stirred in. The gas black suspension was milled in a bead mill with 1 mm siliquartzite beads for 35 minutes. A very free-flowing black dispersion was obtained.

Comparable results are obtained when the 15 parts of the addition compound from Example 3 are replaced by 15 parts of the addition product from Example 10 or by 10 parts of the addition product from Example 8 and 5 parts of the polyol employed in Example 18. These black dispersions are particularly suitable for coloring polyurethane foam materials.

We claim:

1. An addition compound, obtainable from a hydroxyalkylimidazoline of the formula

in which $R^1$ represents an alkyl, alkenyl or alkapolyenyl radical having 6 to 30 C atoms, A represents an alkylene radical having 2 to 6 C atoms and n represents a number from 1 to 20, a diisocyanate of the formula

wherein X represents a bivalent aromatic or araliphatic radical having 6 to 20 C atoms and a polyol of the formula

in which m represents a whole number from 2 to 6 and Y represents an aliphatic radical having at least 2 C atoms, which can be interrupted by —O—,

and —CO— groups and their combinations.

2. An addition compound as claimed in claim 1, obtainable from a hydroxyalkyl compound of the formula (1), in which $R^1$ represents the aliphatic radical of a natural fatty acid, A represents a —CH$_2$—CH$_2$— group and n represents 1.

3. An addition compound as claimed in claim 1, obtainable from a diisocyanate of the formula (2), in which X represents a toluylene, diphenylmethane or naphthylene radical.

4. An addition compound as claimed in claim 1, obtainable from a polyol of the formula (3), in which Y represents an aliphatic radical having 2 to 12 C atoms, which can be interrupted by —O— and/or

groups, and m represents the numbers 2 or 3.

5. An addition compound as claimed in claim 1, obtainable from a polyol of the formula (3), in which Y—[OH]$_m$ represents hydroxyalkylamines or hydroxyalkylamides of the formula

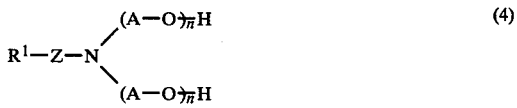

in which $R^1$ represents an alkyl, alkenyl or alkapolyenyl radical having 6 to 30 C atoms, Z represents a —CH$_2$— or —CO— group, A represents an alkylene radical having 2 to 6 C atoms and n represents a number from 1 to 20.

* * * * *